(12) United States Patent
Vollmer

(10) Patent No.: US 6,879,079 B2
(45) Date of Patent: Apr. 12, 2005

(54) PERMANENT MAGNET ROTOR ELECTRICAL SYNCHRONOUS MACHINE WITH DIFFERENT ALTERNATIVELY ARRANGED TOOTH PITCH WIDTHS

(75) Inventor: Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 09/957,544

(22) Filed: Sep. 20, 2001

(65) Prior Publication Data

US 2002/0175587 A1 Nov. 28, 2002

(30) Foreign Application Priority Data

May 18, 2001 (DE) .......................... 101 24 415

(51) Int. Cl.[7] .......................... H02K 1/12; H02K 1/10; H02K 11/00
(52) U.S. Cl. .......................... 310/254; 310/193; 310/179
(58) Field of Search .......................... 310/179, 193, 310/254

(56) References Cited

U.S. PATENT DOCUMENTS

| | | | | |
|---|---|---|---|---|
| 2,235,075 A | * | 3/1941 | Kimball .......................... | 310/186 |
| 2,394,075 A | * | 2/1946 | Kimball .......................... | 310/186 |
| 3,274,412 A | * | 9/1966 | A. Fisher .......................... | 310/186 |
| 3,466,480 A | * | 9/1969 | Bunner et al. .......................... | 310/218 |
| 3,809,938 A | * | 5/1974 | Sjoberg et al. .......................... | 310/254 |
| 4,100,473 A | * | 7/1978 | Lawrenson et al. .......................... | 318/696 |
| 4,874,975 A | * | 10/1989 | Hertrich .......................... | 310/186 |
| 5,418,416 A | * | 5/1995 | Muller .......................... | 310/186 |
| 5,574,342 A | * | 11/1996 | Okamoto .......................... | 318/254 |
| 5,909,072 A | * | 6/1999 | Muller .......................... | 310/68 B |
| 6,300,702 B1 | * | 10/2001 | Jack et al. .......................... | 310/216 |

FOREIGN PATENT DOCUMENTS

| | | |
|---|---|---|
| DE | 19905748 | 8/1999 |
| EP | 0823771 | 2/1998 |

OTHER PUBLICATIONS

European International Search Report, Dec. 2, 2002.

* cited by examiner

*Primary Examiner*—Darren Schuberg
*Assistant Examiner*—Pedro J. Cuevas
(74) *Attorney, Agent, or Firm*—Baker Botts LLP

(57) ABSTRACT

In order to achieve high machine utilization with the magnetic fields having an approximately sinusoidal profile, an electrical synchronous machine is proposed having the following features:

- a stator and a rotor with the stator having a three-phase winding (3) and the rotor being fitted with permanent magnets,
- the three-phase winding (3) is arranged in slots in the stator,
- the slots in the stator are formed by essentially axially running teeth (7, 8) which have at least two different tooth pitch widths $\tau_{zb}$ and which are arranged alternately in the circumferential direction of the stator, with their number in each case being identical,
- only the teeth (7) with a tooth pitch width which is greater than other teeth (8) are at least partially surrounded by a winding (3).

11 Claims, 2 Drawing Sheets

PERMANENT MAGNET ROTOR ELECTRICAL SYNCHRONOUS MACHINE WITH DIFFERENT ALTERNATIVELY ARRANGED TOOTH PITCH WIDTHS

FIELD OF THE INVENTION

The invention relates to an electrical synchronous machine having a stator and a rotor, with the stator having a three-phase winding, and the rotor being fitted with permanent magnets.

BACKGROUND OF THE INVENTION

A synchronous machine is a rotating AC machine, with the excitation field produced by permanent magnets in the rotor. This machine operates as a motor when its stator winding is fed with three-phase current. The rotor synchronously rotates with the rotating field, irrespective of the magnitude of the load torque. When used as a synchronous generator, this machine must be driven by a shaft, so as to convert the mechanical energy to electrical energy which is fed from the stator into the mains system. Operating in this manner has a disadvantageous affect on the torque characteristic, on the loss balance and on the noise of the synchronous machine. These drawbacks are produced, inter alia, by harmonic fields from a relatively large number of poles, which are superimposed on the fundamental field.

For three-phase synchronous machines, windings are known which have different coil widths in order to avoid harmonic fields being induced in the windings. These are interleaved windings, located in slots $N_1$. The number of slots $N_1$ is in this case greater than three times the number of poles 2p. $N_1 > 3 \cdot 2p$.

There are also windings with low-cost tooth coils. In this case, one coil is fitted around one stator tooth. The advantage over interleaved windings is, first, the simplified winding technology and, second, the avoidance of contact between windings in the end winding area. However, one disadvantage is the poor winding factor for harmonic fields. In the case of a tooth coil winding having a number of holes q=½, that is to say $N_1=1.5 \cdot 2p$, the winding factors (wifa) for the fifth and seventh harmonic are very high, wifa (5th/7th)= 0.806. This leads to increased cogging in corresponding motors.

SUMMARY OF THE INVENTION

The object of the present invention is to provide an electrical synchronized machine, particularly for three-phase applications, which results in low stator production costs while at the same time providing high machine utilization with the magnetic fields having an approximately sinusoidal profile. This object is achieved by an electrical synchronized machine having the following features:

a stator and a rotor with the stator having a three-phase winding and the rotor being fitted with permanent magnets;

the three-phase winding is arranged in slots in the stator;

the slots in the stator are formed by essentially axially running teeth which have at least two different tooth pitch widths and which are arranged alternately in the circumferential direction of the stator, with their number in each case being identical; and only the teeth with a tooth pitch width which is greater than other teeth are at least partially surrounded by a winding.

The design according to the present invention enables the electrical machine to produce a magnetic field profile from which the harmonics have virtually been filtered out. It is also advantageous that only every second tooth need be wound with coils and this. This means that only half the number of coils are required, leading to a cost reduction. There is, therefore, no need to provide any phase intermediate layers between two adjacent coils and this results in further cost saving. Furthermore, winding factors close to unity can be achieved, leads to better utilization of the electrical synchronous machine. The winding factor is composed, inter alia, of a zone factor and a pitch factor. The winding coils are in the form of tooth coils and are each positioned around those teeth which have the larger tooth pitch widths.

Positioning the teeth in the region of the airgap in such a manner that the slot width which exists between two teeth is less, at least in sections, in the region of the airgap than the smallest slot width between these teeth means that the magnetic field guidance is improved, while at the same time the tooth coils are advantageously fixed on the poles having a relatively large pitch width; in other words: the tooth heads are broader than the tooth shafts, and are symmetrical. It is preferred the tooth heads can be attached to the tooth shaft by means of positively locking and/or friction joints. This makes it considerably easier to install the tooth coils.

Choosing the tooth widths and pole widths in accordance with the design factors discussed above results in a winding factor of $$wifa(v, \tau_{zb}) = 0.5 \cdot \left(1 - \cos\left(\frac{\tau_{zb}}{\tau_p} \cdot v \cdot \pi\right)\right)^{1/2},$$

which is independent of said widths.
In this equation, $\tau_p$ is the pole pitch; $v=1$ is the fundamental; $v=2, 3 \ldots$ are the harmonics; and $\tau_{zb}=$ is the pitch width of the wound tooth.

From the design point of view, it is advantageous for $\tau_{zb}$ to be in the interval between $0.66 \times \tau_p$ and $1 \times \tau_p$.

BRIEF DESCRIPTION OF THE DRAWINGS

The invention is disclosed in greater detail in the context of exemplary embodiments which are illustrated schematically in the drawing, in which.

DETAILED DESCRIPTION OF THE INVENTION

Figure 1:
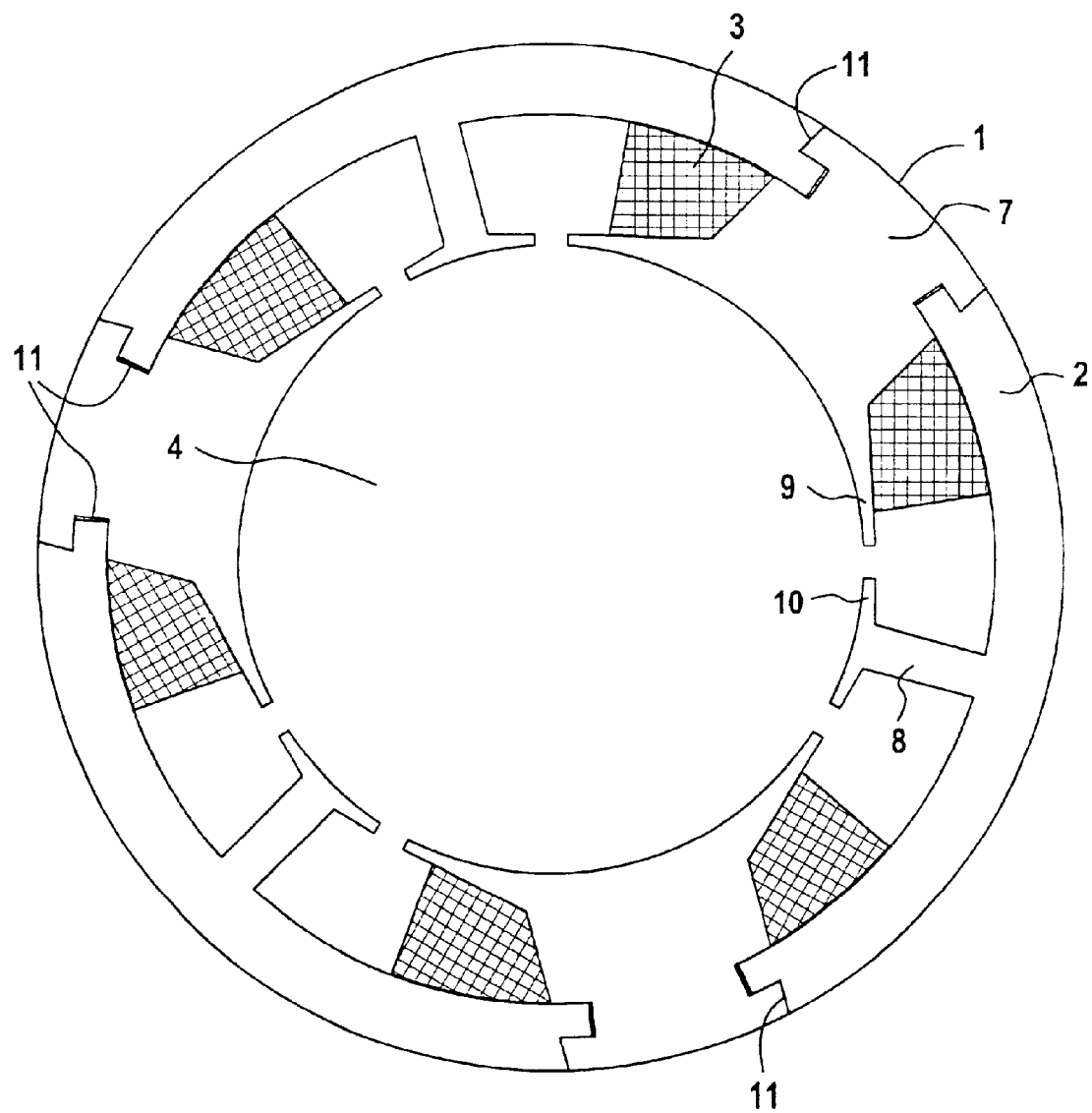
FIG. 1 shows a stator of segment-like construction.

FIG. 1 shows a stator which is constructed with circumferentially segments in the circumferential direction as segments 1 and 2 which, joined to one another in the circumferential direction, are attached to one another by friction and/or a positive lock and enclose the rotor bore 4. The tooth 7 of the segment 1 is in this case provided with a winding 3, which is in the form of a tooth coil. The segment 2, which contains the intermediate tooth 8, has no winding. The segments 1, 2 are joined to one another such that the magnetic reluctance at the transition point 11 increases only insignificantly.

Figure 2:
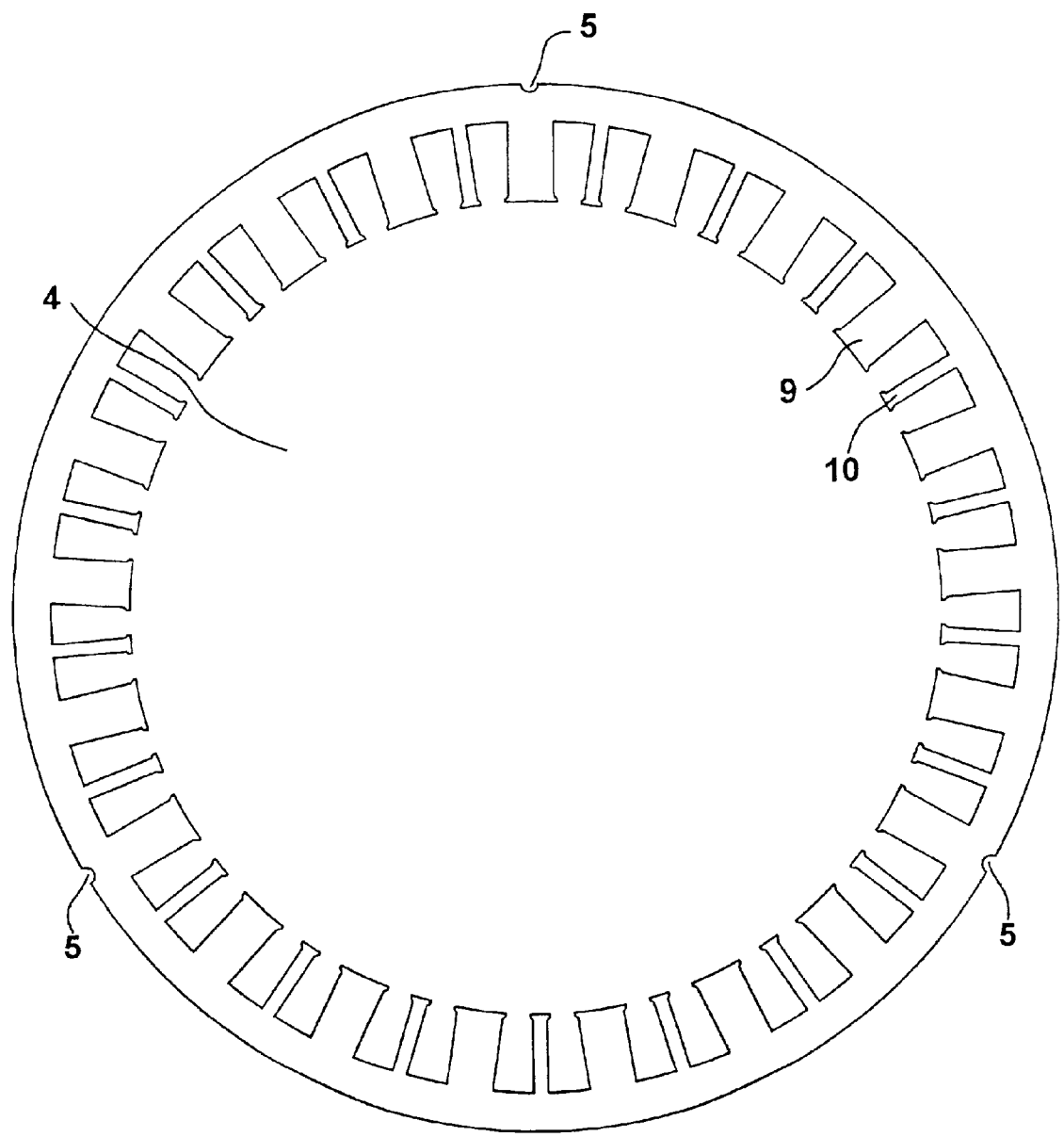
FIG. 2 shows a stator.

FIG. 2 shows an entire laminate section of such an electrical synchronous machine with two different tooth widths. The tooth heads 9, 10 are in this case considerably less pronounced in the direction of the airgap than in FIG. 1, making it easy to install the tooth coils. The laminate section also has cutouts 5 at the radially outer edge of the laminate section, in which corresponding holding elements of a housing, which is not illustrated in any more detail, can advantageously engage.

I claim:

1. An electrical synchronous machine comprising a stator having slots and poles and a rotor, the stator having a three-phase winding arranged in slots in the stator and the rotor being fitted with permanent magnets, wherein the slots in the stator are formed by essentially axially running teeth which have at least two different tooth pitch widths and which are alternately arranged in equal number around the circumference, further wherein only the teeth with a tooth pitch width which is greater than other teeth are at least partially surrounded by a winding.

2. The electrical synchronous machine according to claim 1, wherein the windings are in the form of tooth coils.

3. The electrical synchronous machine according to claim 1, wherein the slot width between two teeth is less, at least in sections, in the region of an airgap than the smallest slot width between these teeth.

4. The electrical synchronous machine according to claim 1, wherein a winding factor is selected in accordance with the following relationship:

$$(v, \tau_{zb}) = 0.5 \cdot \left(1 - \cos\left(\frac{\tau_{zb}}{\tau_p} \cdot v \cdot \pi\right)\right)^{1/2},$$

$v=1$ is the fundamental; and $v=2, 3$ are the harmonics; and $\tau_{zb}=$ is the pitch width of the wound tooth.

5. The electrical synchronous machine according to claim 4, wherein $\tau_{zb}$ is in the interval between $0.66 \times \tau_p$ and $1 \times \tau_p$.

6. The electrical synchronous machine according to claim 1, wherein the number of slots between the teeth corresponds to 1.5 times the number of poles.

7. The electrical synchronous machine according to claim 1, wherein the stator is formed by circumferential segments.

8. The electrical synchronous machine according to claim 7, wherein the segments have at least one tooth.

9. The electrical synchronous machine according to claim 7, wherein the segments are connected to one another in a positively locking manner.

10. The electrical synchronous machine according to claim 7, wherein the segments are connected to one another by techniques selected from the group consisting of bonding, soldering and welding.

11. An electrical synchronous machine comprising a stator having slots and poles and a rotor, the stator having a three-phase winding arranged in slots in the stator and the rotor being fitted with permanent magnets, wherein the slots in the stator are formed by essentially axially running teeth which have at least two different tooth pitch widths and which are alternately arranged in equal number around the circumference, further wherein only the teeth with a tooth pitch width which is greater than other teeth are at least partially wound by a winding and wherein an interval of between about $0.6 \times \tau_p$ and $1 \times \tau_p$ exists between the least partially wound teeth.

* * * * *